C. A. WARD.

TRANSMISSION GEARING.

APPLICATION FILED SEPT. 18, 1912.

Reissued Dec. 1, 1914.

13,838.

Witnesses:
C. A. Jarvis
Beatrice Minis

Inventor:
Charles A. Ward
by Howell & Neal
attorneys.

UNITED STATES PATENT OFFICE.

CHARLES A. WARD, OF NEW YORK, N. Y.

TRANSMISSION-GEARING.

13,838. Specification of Reissued Letters Patent. Reissued Dec. 1, 1914.

Original No. 963,839, dated July 12, 1910, Serial No. 477,691. Application for reissue filed September 18, 1912. Serial No. 721,102.

*To all whom it may concern:*

Be it known that I, CHARLES A. WARD, a citizen of the United States, residing at New York city, in the county of New York and State of New York, have invented certain new and useful Improvements in Transmission-Gearing, of which the following is a specification, reference being had therein to the accompanying drawing.

My invention consists of an improvement in transmission gearing for traction vehicles or any other use to which it is adapted, and is particularly designed to provide means whereby the axle of the vehicle, or a driving counter-shaft, geared with any suitable power-imparting means, as an engine, may be employed to impart rotation to either or both wheels of the axle and to permit slippage of either wheel when running faster than the axle, as in turning corners, and automatic engagement therewith for driving at the normal speed of the axle.

The invention is designed to combine with the hub of the wheels, suitable clutch mechanism adapted to be normally maintained in disengaged relation with the hub and to be coupled therewith automatically due to the rotation of the axle, in either direction, with means for insuring engagement of the parts for operation when desired.

Figure 2:
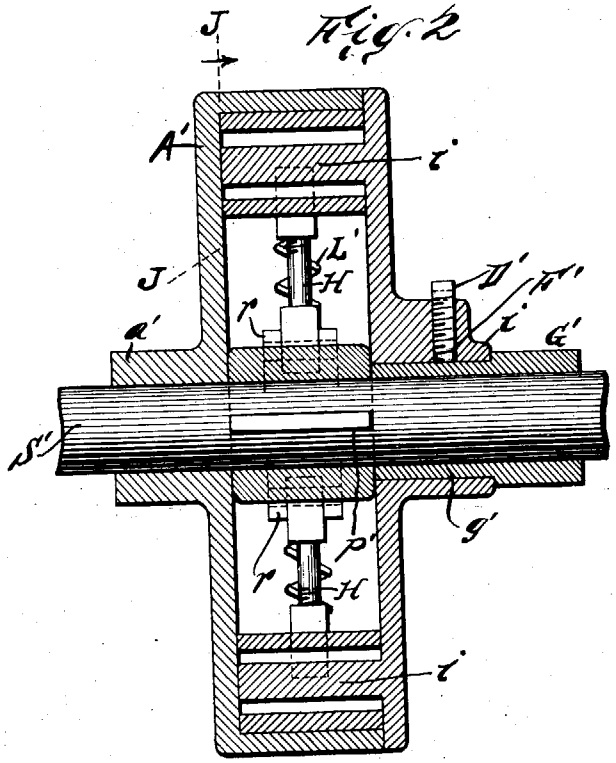
Figure 1:
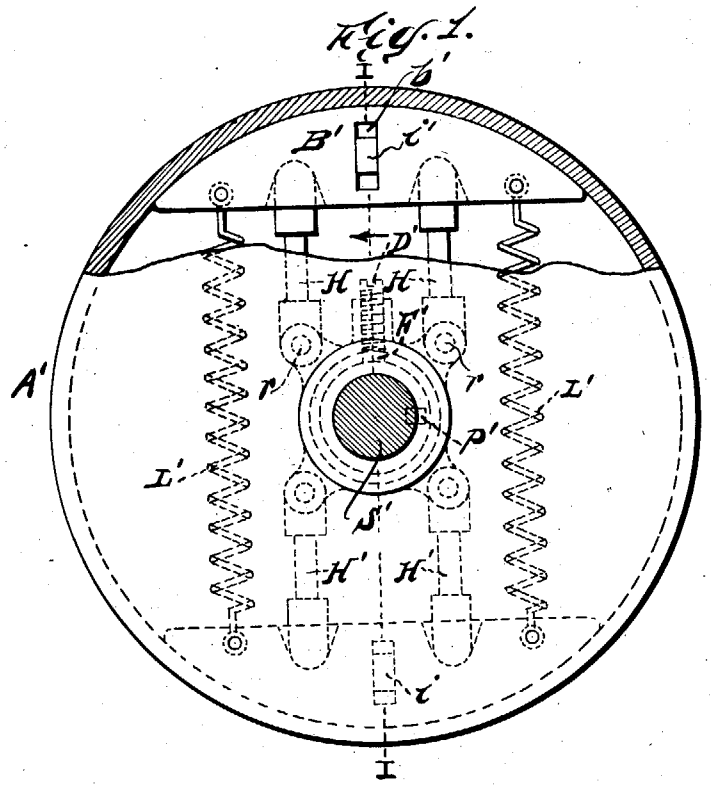

In the accompanying drawings Figure 1 is a view in end elevation of the hub element and its parts, partly broken away; and Fig. 2 is a vertical sectional view indicated by the line I, I, of Fig. 1.

As shown in the drawings, the axle or driving shaft S′ is mounted in bearings G′ having a sleeve $g'$, the wheel hub A′ being mounted by its sleeve $a'$ rotatably upon the axle. The wheel hub is however, provided with a companion casing or head I covering the hub cavity and frictionally held against rotation, and bearing by its hub sleeve $i$ upon the bearing extension $g'$. Said hub $i$ is provided with a holding friction plug F′ and an adjusting set screw D′ for frictional engagement with said bearing extension.

B′ represents friction shoes or clutch members preferably segmental in form, one at each opposite side of the axle, or of any number desired, said shoes being rounded to fit within the inner periphery of the wheel hub A′ as clearly shown, for frictional engagement therewith when pressed outwardly as hereinafter described.

The head I is provided with inwardly extending holding or locking projections extending through suitable receiving slots $b'$ of shoes B′, thereby providing guiding and supporting means for said shoes. It will be observed that the companion head I by means of the engagement of its projections $i$ with the shoes B′ serves to guide and support said shoes in proper radial relationship, and moreover by means of its friction plug F′ tends at all times to retard the rotary travel of said shoes B′ relatively to said wheel. This retarding action on the shoes provides a quick disengagement of the same from the wheel when the latter tends to overrun.

Keyed to the axle S′ by a key $p'$ is a hub R′ connected by radially extending bearing lugs or sockets $r$ and pairs of pitmen H′, with the inner sides of shoes B′. The outer ends of pitmen H′ extend as shown, into suitable receiving sockets on the inner sides of shoes B′ or are connected therewith in any other suitable manner.

The shoes B′ are normally tended to be retracted from frictional engagement by means of springs L′, permitting the wheel and its hub to rotate upon the axle independently of the clutch mechanism, when the speed of the axle is slower than that of the wheels or when the axle is relatively stationary.

The operation of this construction is as follows: Upon rotation of axle S′ the shoes, by means of the rotating hub R′ and pitmen H′, (one at each side only operating) will be thrust outwardly into binding engagement with the inner periphery of the hub and will impart rotative travel thereto and resulting traction. Upon the speed of the wheel exceeding that of the axle, the shoes B′ will be separated therefrom by the rotation of the wheel, the retarding effect of companion head I and the retractive effect of springs L′ and the wheel will remain uncoupled from the coupling mechanism as long as these conditions continue, or until the speed of the axle tends to exceed that of the wheel.

The mechanism may be applied with equally good results to a counter-shaft geared with the prime mover, the counter-shaft being geared with the axle wheels through sprocket mechanism or other suitable means, and either arrangement will operate to produce the effects desired. In addition to the advantages noted, I avoid the necessity of making the axle in two sections with the accompanying usual differential gearing, thus securing the advantages of strength and simplicity inherent in a one-piece axle.

While the construction shown and described is the preferred one for carrying out my invention, it will be understood that it may be variously changed or modified by the skilled mechanic to secure the same results, and that all such changes are to be considered as within the scope of the following claims.

What I claim is:—

1. The combination with a shaft and a bearing therefor, of a wheel freely mounted on the shaft and having an inner annular periphery, a companion head rotatably mounted on the bearing and engaging the periphery of said wheel, a hub secured to the shaft, oppositely arranged friction shoes, means connecting the shoes with the companion head, and pairs of pitmen connecting the shoes with the hub at opposite sides thereof, one pitman of each pair being operated to press the shoe into engagement with the wheel when the speed of the hub tends to exceed from the speed of the wheel, substantially as set forth.

2. The combination with a shaft and a bearing therefor, of a wheel freely mounted on the shaft and having an inner annular periphery, a companion head rotatably mounted on the bearing and engaging the periphery of said wheel, a hub secured to the shaft, oppositely arranged friction shoes, means connecting the shoes with the companion head, pairs of pitmen connecting the shoes with the hub at opposite sides thereof, one pitman of each pair being operative to press the shoe into engagement with the wheel when the speed of the hub tends to exceed from the speed of the wheel, and means for retracting the shoes, substantially as set forth.

3. The combination with a shaft and a bearing therefor, of a wheel freely mounted on the shaft having an inner annular periphery, a companion head mounted on the bearing, a hub secured to the shaft, oppositely arranged friction shoes, a plurality of pitmen connecting each shoe with the hub, and means extending inwardly from the companion head and engaging the shoes providing guiding means therefor, substantially as set forth.

4. The combination with a shaft and a bearing therefor, of a wheel freely mounted on the shaft having an inner annular periphery, a companion head mounted on the bearing and engaging said wheel, a hub secured to the shaft, oppositely arranged friction shoes fixedly engaging the companion head against lateral movement but having a limited radial movement independent thereof, a plurality of pitmen connecting each shoe with the hub, and springs connecting the shoes, substantially as set forth.

5. The combination with the axle and its bearing having an extended sleeve, of a vehicle wheel freely mounted by its hub upon the axle, oppositely arranged clutching shoes adapted to frictionally engage the interior of the wheel, a companion head mounted on the sleeve with friction mechanism and engaging the vehicle wheel hub, means connecting the companion head with said shoes, an inner hub in rigid engagement with the shaft having oppositely arranged pairs of pitmen engaging the shoes at each side of the center thereof, and means for retracting the shoes, substantially as set forth.

6. The combination with the axle and its bearing having an extended sleeve, of a vehicle wheel freely mounted by its hub upon the axle, oppositely arranged clutching shoes adapted to frictionally engage the interior of the wheel, a companion head mounted on the sleeve with friction mechanism, a hub in rigid engagement with the shaft having pitmen engaging the shoes at each side of the center thereof, springs connecting the shoes, and centering keys extending inwardly from the companion head and engaging the shoes, substantially as set forth.

7. In a clutch mechanism in combination, a driving element and a driven element separately journaled for rotating about a common axis, one or more clutch members arranged to connect said driving element with said driven element, an actuator secured to said driving element for rendering said clutch members operative when the rotation of said driving element tends to exceed that of the driven element, a device tending to retard the rotary travel of said clutch members relatively to said driven member, and means acting independently of said clutch members tending at all times to withdraw the latter from engagement with said driven member whereby said driven member may rotate freely at a greater speed than said driving member.

8. In a clutch mechanism in combination, a driving shaft, a wheel rotatably mounted thereon, one or more clutch members arranged to connect said shaft with said wheel, an actuator fast on said shaft for rendering said clutch members operative when the rotation of said shaft tends to exceed that of said wheel, a friction device tending to retard the rotary travel of said clutch members relatively to said wheel, and spring means acting independently of said clutch members tending at all times to withdraw the latter from engagement with said wheel whereby said wheel may rotate freely at a greater speed than said driving shaft.

9. In a clutch mechanism in combination, a driving shaft, a wheel rotatably mounted thereon having a peripheral clutching surface, one or more clutch members for cooperative engagement with said clutching surface in driving said wheel from said shaft, an actuator fast on said shaft arranged to carry said clutch members into operative engagement with said clutching surface when the rotation of said shaft tends to exceed that of said wheel, a device tending to retard the rotary travel of said clutch members relatively to said wheel, and spring means acting independently of said clutch members tending at all times to withdraw the latter from engagement with said wheel whereby said wheel may rotate freely at a greater speed than said driving shaft.

10. In a clutch mechanism in combination, a driving shaft, a wheel rotatably mounted thereon having an inner peripheral clutching surface, one or more segmental clutch shoes having an outer surface fitting said wheel surface and movable into and out of engagement therewith, a guiding support for directing the movement of said clutch shoes radially, an actuator fast on said shaft arranged to carry said clutch shoes into engagement with said wheel and thereby drive said wheel when the rotation of said shaft tends to exceed that of said wheel, a friction device tending to retard the rotary travel of said clutch shoes relatively to said wheel, and spring means acting independently of said clutch shoes tending at all times to withdraw the latter from engagement with said wheel whereby said wheel may rotate freely at a greater speed than said driving shaft.

11. In a clutch mechanism in combination, a driving shaft, a wheel rotatably mounted thereon having an inner peripheral clutching surface, one or more segmental clutch shoes having an outer surface fitting said wheel surface and movable into and out of engagement therewith, a guiding support engaging said clutch shoes for directing the movement of the same in a radial direction, said guiding support being frictionally held from rotation about said shaft for retarding the rotary travel of said clutch shoes relatively to said wheel, an actuator fast on said shaft arranged to carry said clutch shoes into engagement with said wheel surface and thereby drive said wheel when the rotation of said shaft tends to exceed that of said wheel, but allowing said wheel to rotate freely at a greater speed than said driving shaft.

12. In a clutch mechanism in combination, a driving shaft, a wheel rotatably mounted thereon having an annular flange at its periphery providing an inner clutching surface, one or more segmental clutch shoes having an outer surface fitting said wheel surface and movable into and out of gripping contact therewith, a companion head for said wheel frictionally held from rotation about said shaft and having one or more projections for engaging said clutch shoes to support and guide the same in a radial direction, a hub fast on said shaft provided with means to engage and move said clutch shoes into gripping contact with said wheel surface and thereby drive said wheel when the rotation of said shaft tends to exceed that of said wheel, but allowing said wheel to rotate freely at a greater speed than said driving shaft.

In witness whereof I have hereunto set my hand this 17th day of September, 1912, at New York, N. Y.

CHARLES A. WARD.

Witnesses:
BEATRICE MIRVIS,
EMERSON R. NEWELL.